United States Patent
Watanabe

(10) Patent No.: US 10,268,427 B2
(45) Date of Patent: Apr. 23, 2019

(54) PRINT CONTROL APPARATUS FOR PERFORMING WIRELESS COMMUNICATION, CONTROL METHOD, AND STORAGE MEDIUM

(71) Applicant: CANON KABUSHIKI KAISHA, Tokyo (JP)

(72) Inventor: Tokiko Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/008,189

(22) Filed: Jan. 27, 2016

(65) Prior Publication Data

US 2016/0224287 A1    Aug. 4, 2016

(30) Foreign Application Priority Data

Jan. 30, 2015   (JP) ................................ 2015-017861

(51) Int. Cl.
    *G06F 3/12* (2006.01)
    *H04N 1/00* (2006.01)
(52) U.S. Cl.
    CPC .......... *G06F 3/1236* (2013.01); *G06F 3/1213* (2013.01); *G06F 3/1292* (2013.01); *H04N 1/00891* (2013.01)

(58) Field of Classification Search
    None
    See application file for complete search history.

(56) References Cited

U.S. PATENT DOCUMENTS

| | | | |
|---|---|---|---|
| 6,650,436 B1* | 11/2003 | Hamamoto | B41J 11/425 271/202 |
| 2003/0203744 A1* | 10/2003 | Otsuka | H04M 1/274516 455/551 |
| 2006/0216043 A1* | 9/2006 | Evans | B41J 3/546 399/6 |
| 2012/0127523 A1* | 5/2012 | Terashita | G06F 3/1203 358/1.15 |
| 2015/0293838 A1* | 10/2015 | Chimura | G06F 12/023 711/170 |

FOREIGN PATENT DOCUMENTS

| JP | 2003-103802 A | 4/2003 |
|---|---|---|
| JP | 2012199829 A | 10/2012 |
| JP | 2013142733 A | 7/2013 |
| JP | 2014215893 A | 11/2014 |

* cited by examiner

*Primary Examiner* — Huo Long Chen
(74) *Attorney, Agent, or Firm* — Canon U.S.A., Inc. IP Division

(57) ABSTRACT

A print control apparatus enables a network setting to be changed during print preparation processing executed at the arrival, thereby enabling the user to bring start time to use the print control apparatus forward.

20 Claims, 7 Drawing Sheets

PRINT CONTROL APPARATUS FOR PERFORMING WIRELESS COMMUNICATION, CONTROL METHOD, AND STORAGE MEDIUM

BACKGROUND OF THE INVENTION

Field of the Invention

The present invention relates to a print control apparatus for performing wireless communication, a control method, and a storage medium.

Description of the Related Art

Conventionally, a user who has purchased a printing apparatus has sequentially performed the cleaning of a print head, the position adjustment of the print head, and a setting for connection with an external device, at initial settings performed after the first power-on (hereinafter, referred to as "at arrival"). In addition, Japanese Patent Application Laid-Open No. 2003-103802 describes determining whether a cleaning process has been executed since an alternating current (AC) power supply of the printing apparatus is turned ON. Japanese Patent Application Laid-Open No. 2003-103802 further describes determining, when the cleaning process has not been executed, details of the cleaning based on the elapsed time from the previous execution of the cleaning process.

Nevertheless, if the cleaning process of the printing apparatus, other print preparation processes, and the like are sequentially performed, there has been such a problem that it takes time until the printing apparatus becomes ready to be actually used. In addition, in Japanese Patent Application Laid-Open No. 2003-103802, consideration is not given to shortening of the time taken for the processing performed when the AC power supply of the printing apparatus is turned ON.

SUMMARY OF THE INVENTION

The present invention aims to provide a printing apparatus that can improve usability for users by shorting time taken for processing performed at arrival.

To solve the above-described problem, a print control apparatus according to an aspect of the present invention is a print control apparatus capable of communicating with an external apparatus, and the print control apparatus includes an execution unit configured to execute print preparation processing for executing print processing onto a recording medium, when the print control apparatus is activated, and a setting unit configured to set a connection parameter necessary for connecting to the external apparatus, during execution of the print preparation processing.

Further features of the present invention will become apparent from the following description of exemplary embodiments (with reference to the attached drawings).

DESCRIPTION OF THE EMBODIMENTS

An exemplary embodiment of the present invention will be described in detail below as an example with reference to the drawings. Nevertheless, the relative arrangement of constituent elements, display screens, and the like that are described in the present exemplary embodiment are not to be construed in a limiting sense.

Figure 1:
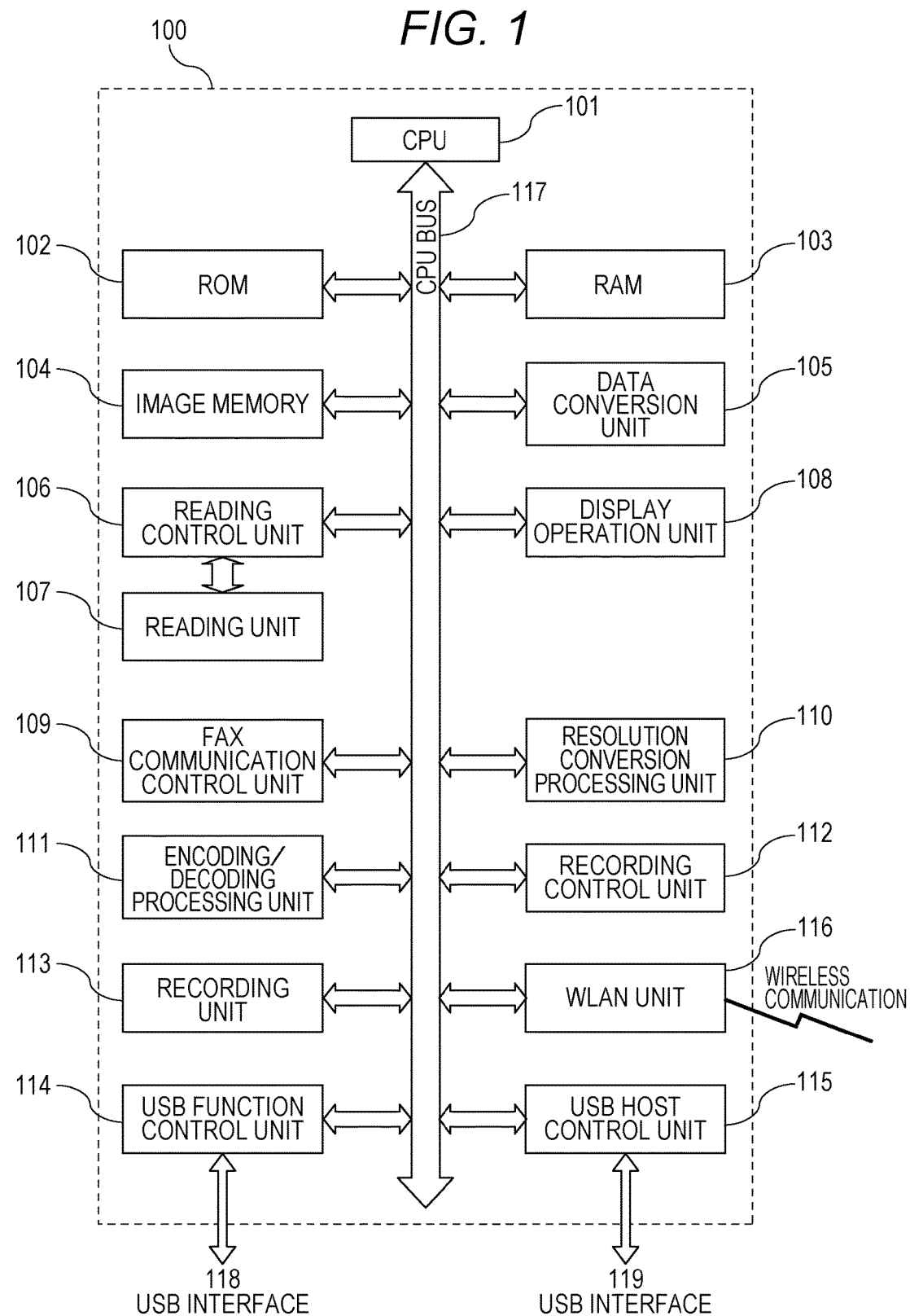
FIG. 1 is a functional block diagram illustrating a schematic configuration of a multifunction peripheral (MFP) 100 according to an exemplary embodiment of the present invention.

FIG. 1 is a block diagram illustrating a schematic configuration of a multifunction peripheral (MFP) 100 according to an exemplary embodiment of the present invention. Herein, the multifunction peripheral may be sometimes referred to as a print control apparatus, or a system control unit to be described later may be sometimes referred to as a print control apparatus. In addition, the multifunction peripheral can communicate with an external apparatus (e.g., a personal computer (PC) or a mobile terminal) wirelessly or in a wired manner.

A central processing unit (CPU) 101 is a system control unit, and controls the entire MFP 100. A read-only memory (ROM) 102 stores fixed data such as control programs to be executed by the CPU 101, data tables, embedded operating system (OS) programs, and the like. In the present exemplary embodiment, each control program stored in the ROM 102 perform software execution control such as scheduling, task switching, and interrupt processing under the management of the embedded OS stored in the ROM 102. A random access memory (RAM) 103 is formed by, for example, a static random access memory (SRAM), and stores data not to be erased, such as program control variables. In addition, the RAM 103 is also provided with a memory area for storing, at factory shipment, information being set by default at power-on, such as information indicating whether it is the first initial setting after the power of the MFP 100 is turned on.

An image memory 104 is formed by, for example, a dynamic random access memory (DRAM), and accumulates image data. In addition, a partial area of the image memory 104 is secured as a work area for execution of software processing. A data conversion unit 105 performs conversion of image data such as analysis of page-description language (PDL) and rasterization of computer graphics (CG) of character data. A reading control unit 106 causes a reading unit 107 to optically read a document using a contact image sensor (CIS), and convert the read document into electrical image data to obtain an image signal. Then, various types of image processing such as binarization processing and halftone processing are performed on the obtained image signal, thereby outputting high-resolution image data. In addition, the reading control unit 106 and the reading unit 107 may employ any of the following two control methods. The first method is a sheet reading control method of reading a document using a fixed CIS while conveying the document. In addition, the second method is a book reading control method of scanning a document fixed on a document platen, using a moving CIS. A display operation unit 108 includes keys such as a numeral input key, a mode setting key, a determination key, and a cancellation key, a light emitting diode (LED), a liquid crystal display (LCD), and the like.

Through the display operation unit 108, the user can activate various functions as a multifunction peripheral, and perform various settings.

A FAX communication control unit 109 is connected to a telephone line, and performs transmission and reception of a FAX image with a FAX machine (not illustrated). A resolution conversion processing unit 110 performs resolution conversion control such as the interconversion between millimeter-based image data and inch-based image data. In addition, the resolution conversion processing unit 110 can also perform enlargement/reduction processing of image data. An encoding/decoding processing unit 111 performs bidirectional encoding/decoding processing and enlargement/reduction processing of image data handled by the MFP 100 (e.g., uncompressed, MH, MR, MMR, JBIG, and JPEG image data). A recording control unit 112 performs, via the image processing control unit (not illustrated), various types of image processing such as smoothing processing, recording density correction processing, and color correction on image data to be printed, to convert the image data into high-resolution image data, and outputs the obtained image data to a recording unit 113.

In addition, based on the information obtained from the recording unit 113, the recording control unit 112 detects a mounting state of a recording head and a mounting state of an ink tank. The recording unit 113 is a recording unit including a laser beam printer, an ink jet printer, and the like, and prints color image data or monochrome image data generated by the recording control unit 112, onto a print material. A universal serial bus (USB) function control unit 114 is provided for performing communication control of a USB interface, and performs protocol control according to a USB communication standard. The USB function control unit 114 converts, into a packet, data from a USB function control task executed by the CPU 101, and transmits the USB packet to the PC 200. In addition, the USB function control unit 114 converts a USB packet from an outside PC into data, and transmits the data to the CPU 101. In addition, the USB function control unit 114 detects that the MFP 100 is connected to the PC 200 via a USB. A USB host control unit 115 is a control unit for performing communication according to a protocol defined in the USB communication standard. The USB communication standard is a standard that enables bidirectional data communication to be performed at high speed. According to the USB communication standard, a plurality of hubs or functions (slaves) can be connected to a single host (master). The USB host control unit 115 functions as a host in the USB communication.

A wireless local area network (WLAN) unit 116 communicates with a terminal on a network (network that can perform communication according to the Transmission Control Protocol/Internet Protocol (TCP/IP)) through wireless communication. The WLAN unit 116 is assumed to be capable of performing data (packet) communication with an access point (hereinafter, referred to as "AP") (not illustrated) and the PC 200 in a WLAN system compliant with the Institute of Electrical and Electronics Engineers (IEEE) 802.11 series, for example. In addition, the wireless communication via the WLAN unit 116 includes modes such as a software AP mode and a WFD mode in which wireless communication is performed based on Wi-Fi Direct (registered trademark) (WFD). In addition, the WLAN unit 116 can perform wireless communication in an ad hoc mode in which communication is performed without using an AP and in an infrastructure mode in which communication is performed through an external AP (relay AP). The MFP 100 can operate in any of the following modes while switching therebetween: a WFD extension mode in which an extended service is performed based on the WFD, the infrastructure mode in which wireless communication is performed via a relay AP other than an own apparatus, the ad hoc mode, and the like, in addition to the above-described software AP mode and the WFD mode. In addition, these modes are not necessarily set in an exclusive manner, and a plurality of modes may be set at the same time in some cases. The above-described constituent elements 101 to 106 and 108 to 116 are connected to one another via a CPU bus 117 managed by the CPU 101.

Figure 2:
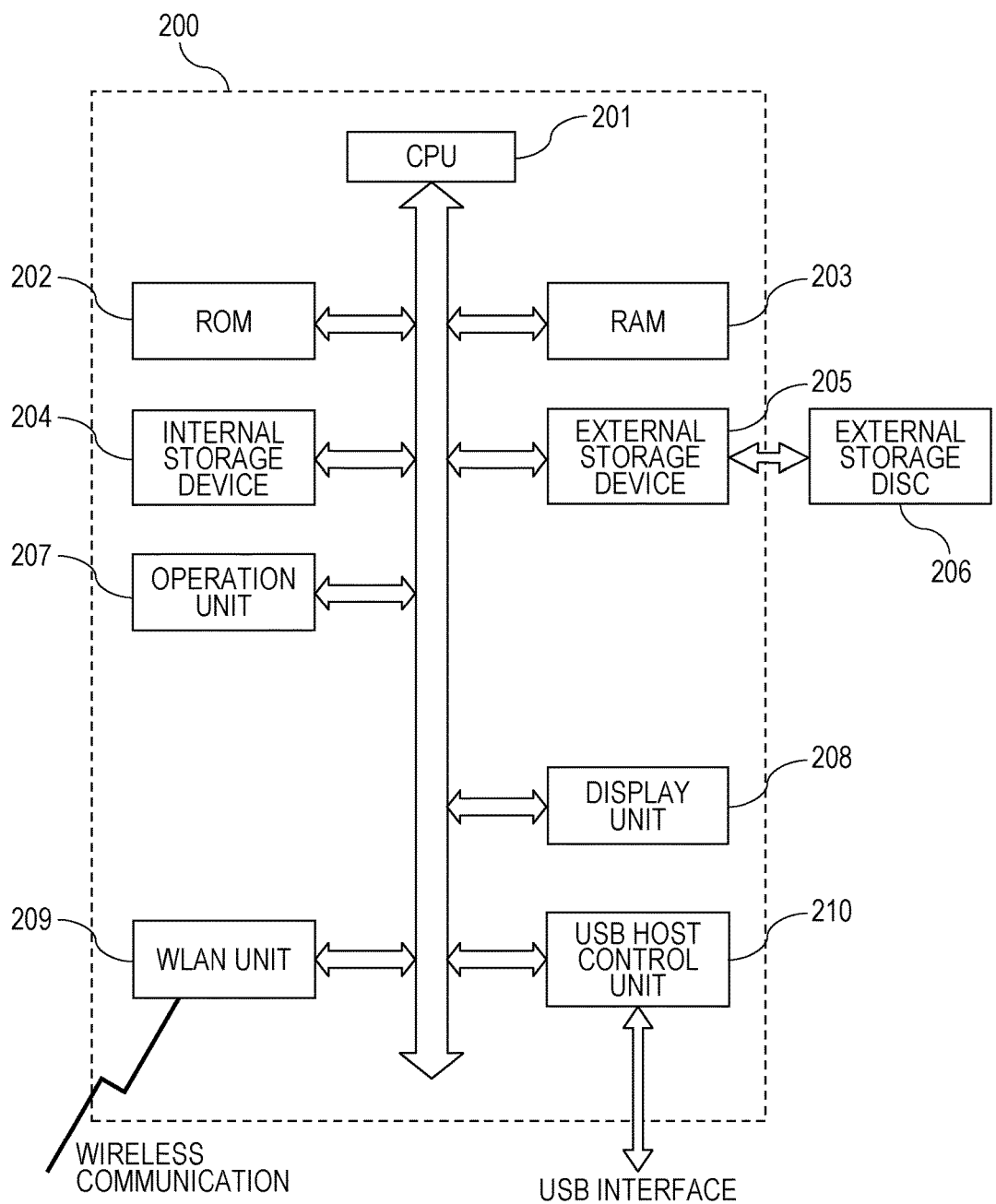
FIG. 2 is a functional block diagram illustrating a schematic configuration of a personal computer (PC) 200 according to an exemplary embodiment of the present invention.

FIG. 2 is a block diagram illustrating a schematic configuration of the PC 200 according to an exemplary embodiment of the present invention. A CPU 201 is provided for controlling an operation of the entire PC 200 via a system bus according to a program read from an external storage medium (an external storage disk) 206 via a ROM 202, a RAM 203, an internal storage device 204, or an external storage device 205. The ROM 202 stores control programs of the CPU 201 and the like. The RAM 203 is provided for temporarily storing programs and image data to operate processes at high speed. An operating system, programs of various applications such as a wireless LAN setting application, image data, and the like are stored in the internal storage device 204. Generally, data of these pieces of application software are read from other computer-readable media storing them via the external storage medium 206 (e.g., compact disc (CD)/digital versatile disk (DVD) media), and these pieces of application software are installed by controlling the external storage device 205.

An operation unit 207 is provided for controlling a keyboard (not illustrated) and a mouse (not illustrated) that serve as an instruction input unit for inputting an instruction from the user. A display unit 208 provides various types of displays to the user. A WLAN unit 209 communicates with an AP (not illustrated) and the MFP 100 through wireless communication. Since the description of the WLAN unit 209 is similar to that of the WLAN unit 116, the detailed description is omitted here. A USB host control unit 210 functions as a host in USB communication, and communicates with the MFP 100. Since the description of the USB host control unit 210 is similar to that of the USB host control unit 115, the detailed description is omitted here.

Figure 3:
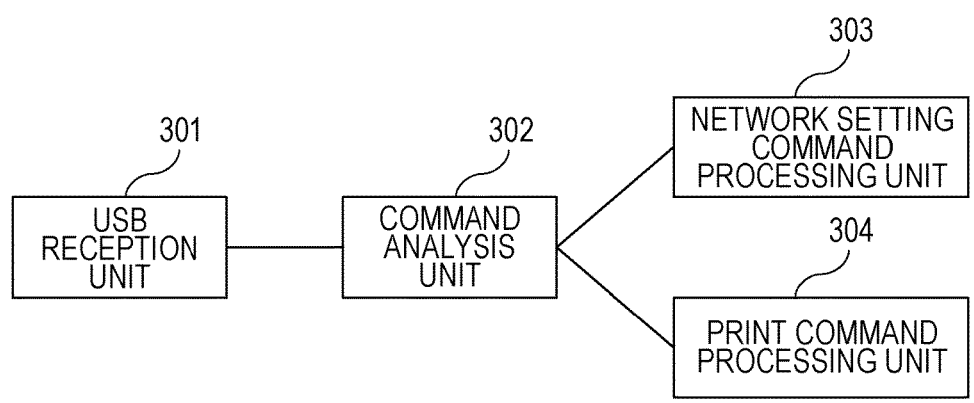
FIG. 3 is a functional block diagram illustrating command analysis of the MFP 100 according to an exemplary embodiment of the present invention.

FIG. 3 illustrates modules included in the USB function control unit 114 of the MFP 100 according to an exemplary embodiment of the present invention. Modules 301 to 304 are used for executing command analysis.

Data received by a USB reception unit 301 via a USB is analyzed by a command analysis unit 302. If the data is analyzed to be command data related to network setting, a network setting command processing unit 303 analyzes the data. On the other hand, if the data is analyzed to be command data related to printing, a print command processing unit 304 analyzes the data.

Figure 4A:
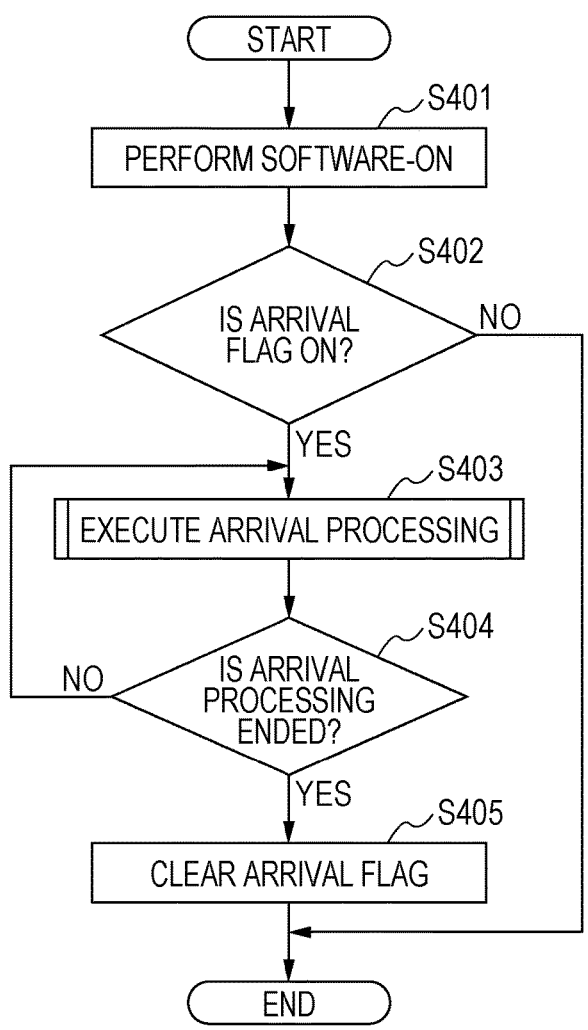
FIGS. 4A-4C are flowcharts illustrating flows of arrival setting processing performed by the MFP 100 according to an exemplary embodiment of the present invention.

FIG. 4A is a flowchart illustrating a flow of arrival processing (also referred to as print preparation processing) performed by the MFP 100 according to an exemplary embodiment of the present invention. In addition, each step in the flowchart that is executed by the MFP 100 according to the present invention is realized by the CPU 101 reading and executing a program related to the flowchart.

If the CPU 101 detects that the user has pressed a power button of the display operation unit 108, in step S401, the CPU 101 performs software-on. The software-on refers to an operation of activating software by pressing the power button of the display operation unit 108, when the MFP 100 is connected to a power supply and the hardware power supply is turned on, but software is not operated on the MFP 100. In step S402, the CPU 101 determines whether it is at the arrival, by referring to information indicating whether it is at the arrival that is stored in the RAM 103. More specifically, when the user activates the MFP 100 for the first time, an arrival flag in the RAM (storage unit) 103 is set to ON. On the other hand, when the MFP 100 is activated for the second or subsequent time, the arrival flag in the RAM 103 is set to OFF. The CPU 101 implements the process in step S402 by referring to ON/OFF of the arrival flag. If it is determined in step S402 that it is not at the arrival (NO in step S402), the CPU 101 performs normal software-on processing. As the normal software-on processing, for example, processing such as initialization of each module in the MFP 100 is executed. In the normal software-on processing, registration adjustment is not executed.

On the other hand, if it is determined in step S402 that it is at the arrival (YES in step S402), in step S403, the CPU 101 execute arrival processing necessary for making the MFP 100 available. If it is determined in step S404 that all the arrival processing has been ended (YES in step S404), in step S405, the CPU 101 clears the arrival flag stored in the RAM 103, and ends the arrival processing. The arrival flag is set to OFF through the process in step S405. Thus, when the MFP 100 is activated for the second or subsequent time, the process in step S403 is not executed. In the present exemplary embodiment, the process in step S402 is executed using ON/OFF of the arrival flag. Alternatively, the process in step S402 may be executed using information other than the flag. For example, the processing in the flowchart may be realized in the following manner. First, information indicating that it is at the arrival is stored in the RAM 103. Then, in step S402, the CPU 101 determines whether the information indicating that it is at the arrival is stored in the RAM 103. In step S405, the CPU 101 deletes the information indicating that it is at the arrival.

Figure 4B:
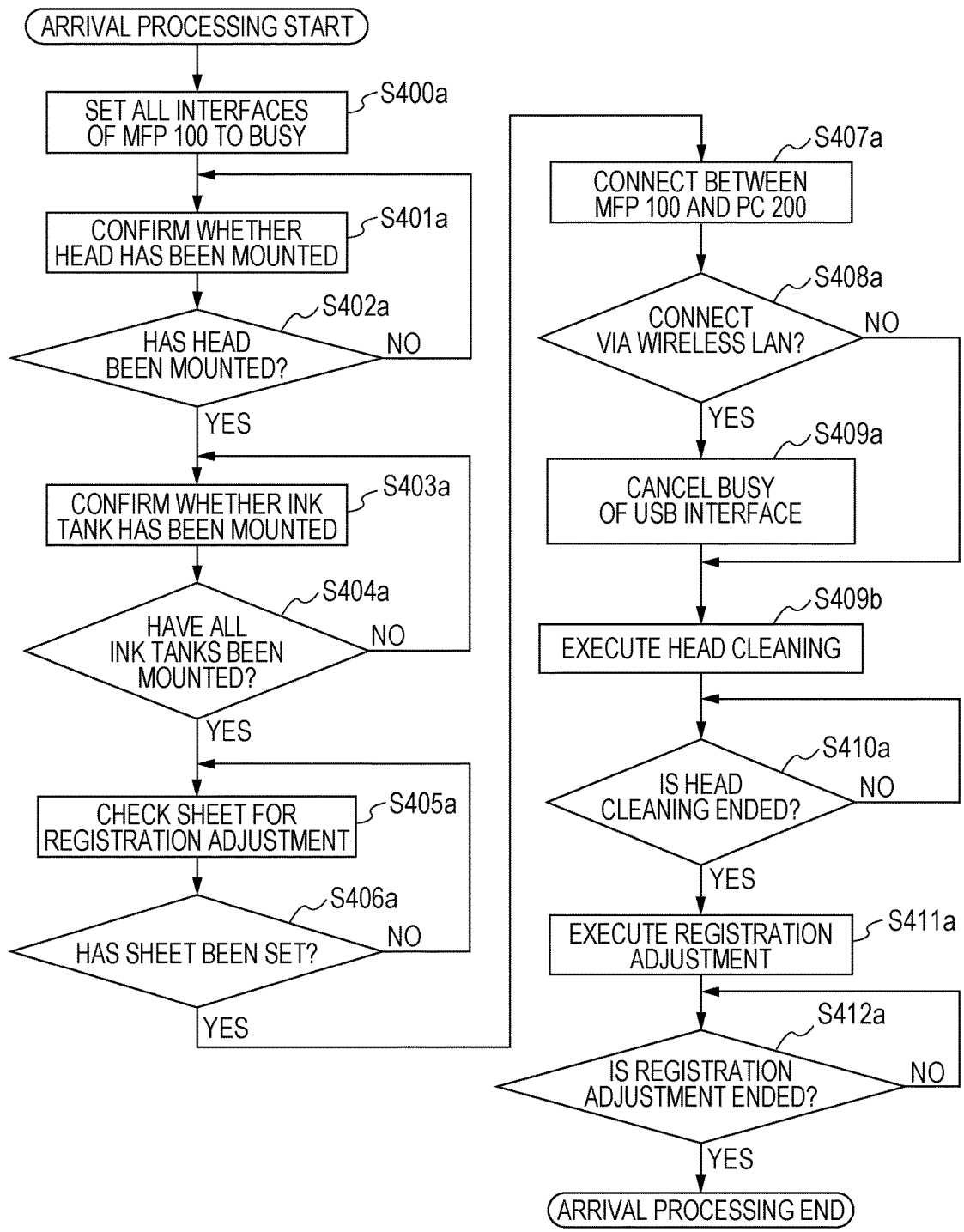

Next, the detailed flow of the arrival processing performed in step S403 will be described with reference to FIG. 4B.

If it is determined to be at the arrival after the software-on, the MFP 100 is in a state in which the MFP 100 cannot execute, as a device, a job such as printing until the arrival processing is completed. Thus, even if the MFP 100 receives print data from an external device, the MFP 100 cannot execute printing. For this reason, in step S400a, the CPU 101 sets all the external interfaces such as USB interfaces 118 and 119 to Busy so as not to receive data from an external terminal until the arrival processing ends. By setting communication interfaces to a Busy state in this step, the MFP 100 can avoid receiving print data during print preparation processing. For example, when the MFP 100 is connected to the PC 200 via the USB interface 118, the MFP 100 returns a negative acknowledge (NAK) response to Bulk-Out transfer of the USB interface 118. In addition, information indicating that an interface is busy is transmitted to the PC 200 via Bulk-In transfer of a USB from the USB function control unit 114, as status information of the MFP 100.

By analyzing the status information acquired from the MFP 100 in the programs of various applications such as a wireless LAN setting application that are stored in the internal storage device 204 of the PC 200, notification indicating that the MFP 100 is in a state of being unable to receive data can be displayed.

Next, the CPU 101 displays, on the display operation unit 108, information for prompting the user to mount the recording head. Then, in step S401a, the CPU 101 confirms whether the head has been mounted by a user operation, based on information acquired from the recording unit 113 by the recording control unit 112.

If it is confirmed that the head has been mounted (YES in step S402a), the CPU 101 displays, on the display operation unit 108, information for prompting the user to mount the ink tank. Then, in step S403a, the CPU 101 confirms whether the ink tank has been mounted by a user operation, based on information acquired from the recording unit 113 by the recording control unit 112.

If it is confirmed that the ink tank has been mounted (YES in step S404a), the CPU 101 displays, on the display operation unit 108, information for prompting the user to set a sheet (recording medium) for printing a registration adjustment pattern. Then, in step S405a, the CPU 101 checks the sheet. Information indicating whether the sheet has been set is input by the user using the display operation unit 108. Instead of the user inputting the information indicating the setting of the sheet, whether the sheet has been set may be detected using a sensor.

Next, if it can be confirmed that the sheet has been set (YES in step S406a), in step S407a, the CPU 101 selects a connection interface to be used for performing communication processing between the PC 200 and the MFP 100. In addition, the selection process in step S407a is realized by displaying options (501-503) of connection methods illustrated in FIG. 5, on the display operation unit 108, and receiving from the user selection of a connection method to be used.

Figure 5:
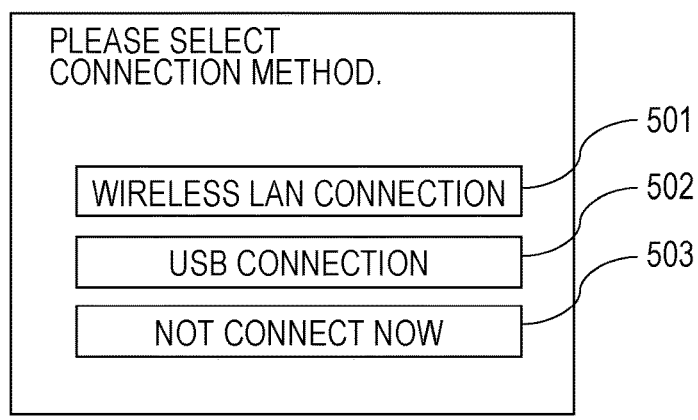
FIG. 5 illustrates a display operation unit of the MFP 100 according to an exemplary embodiment of the present invention.

FIG. 5 relates to an exemplary embodiment of the present invention, and illustrates an example of a selection screen displayed on the display operation unit 108 for the MFP 100 receiving the selection of a connection interface in the arrival flow.

When USB connection 502 is selected from among the options of connection interfaces for connecting to the PC 200, the USB function control unit 114 performs data transmission and reception via the USB interface 118. On the other hand, when a wireless LAN connection 501 is selected, the CPU 101 performs setting for using wireless LAN, and the WLAN unit 116 performs wireless LAN communication with the PC 200.

If it is determined in step S408a that the wireless LAN connection 501 on the selection screen (FIG. 5) is selected by the user (YES in step S408a), in step S409a, the USB function control unit 114 cancels the Busy of the USB interface 118 to enable data reception from a USB.

Then, the CPU 101 issues an instruction for filling the ink stored in the ink tank into the mounted head, and in step S409b, the CPU 101 executes head cleaning for enabling the execution of printing. If it is determined in step S410a that the head cleaning is ended (YES in step S410a), the CPU 101 performs various types of correction such as the correction of variation in nozzle position of the mounted head to adjust a discharge timing, and in step S411a, the CPU 101 performs registration adjustment for obtaining an accurate print result. The registration adjustment is achieved by printing several types of patterns, and receiving from the user the selection of a desired pattern from among print results. Alternatively, the registration adjustment is achieved by reading the print results of the patterns using a sensor, and determining a correction value.

If it is determined in step S412a that the registration adjustment is ended (YES in step S412a), the CPU 101 ends the arrival processing, and the processing proceeds to step S405 in FIG. 4A.

If the series of arrival processes is ended, in step S405, the CPU 101 clears the arrival flag, and completes the arrival processing.

In addition, although data reception from the USB interface 118 is enabled in step S409a, processing of received data and processing based on the received data are concurrently executed in a different task and in a different process from the execution of the head cleaning in step S409b and the execution of the registration adjustment in step S411a. The processing performed by the CPU 101 during the execution of the arrival processing includes a time zone having operational leeway. The arrival processing to be described later and change processing of the wireless LAN setting are executed utilizing this time zone.

Next, the data reception processing performed after cancelling the USB interface Busy at the arrival of the MFP 100 according to an exemplary embodiment of the present invention will be described with reference to the flowchart in FIG. 4C.

Upon the wireless LAN connection 501 being selected on the selection screen in FIG. 5, the Busy of the USB interface 118 is canceled. Then, in step S401b, the USB function control unit 114 waits for data reception from the USB interface 118.

If it is determined in step S402b that data is received from the USB interface 118 (YES in step S402b), in step S403b, the USB function control unit 114 analyzes the received data. If it is determined in step S404b that the data is not a wireless LAN setting command (e.g., if it is determined that the data is print data), as a result of the analysis of the received data (NO in step S404b), in step S406b, the USB function control unit 114 reads and discards the received data as invalid data. In this step, the USB function control unit 114 may return a response to the received command as an invalid command. In addition, in step S404b, it is determined whether the received data is a wireless LAN setting command, by analyzing the header of the received data.

If it is determined in step S404b that the received data is a wireless LAN setting command (YES in step S404b), in step S405b, the USB function control unit 114 analyzes the wireless LAN setting command. Then, the USB function control unit 114 acquires setting values (also referred to as connection parameters or communication parameters) necessary for a wireless LAN connection, such as a service set identifier (SSID), an encryption method, and a passphrase that are included in the wireless LAN setting command. The setting values acquired from the wireless LAN setting command are stored into the RAM 103 as setting values of the device. Then, in step S407b, the CPU 101 sets the setting values included in the wireless LAN setting command and stored in the RAM 103, for a wireless LAN connection.

As described above, if the wireless LAN connection 501 is selected on the selection screen in FIG. 5 that is displayed during the execution of the arrival processing, the USB interface Busy is canceled, and only a wireless LAN setting command is made receivable. As a result, wireless LAN setting can be performed from an external terminal such as the PC 200 via the USB interface 118 during the execution of the cleaning or the registration adjustment. In other words, since wireless LAN setting can be executed concurrently with the cleaning and the registration adjustment in the present exemplary embodiment, the time taken for the arrival processing can be shortened as compared with that in the processing of executing the wireless LAN setting after the preparation processing related to print processing such as the cleaning and the registration adjustment. In addition, while the MFP 100 receives a wireless LAN setting command via the USB interface 118, the MFP 100 reads and discards data other than wireless LAN setting commands. This can prevent printing undesired by the user from being executed by receiving print data during the cleaning or the registration adjustment.

Figure 4C:
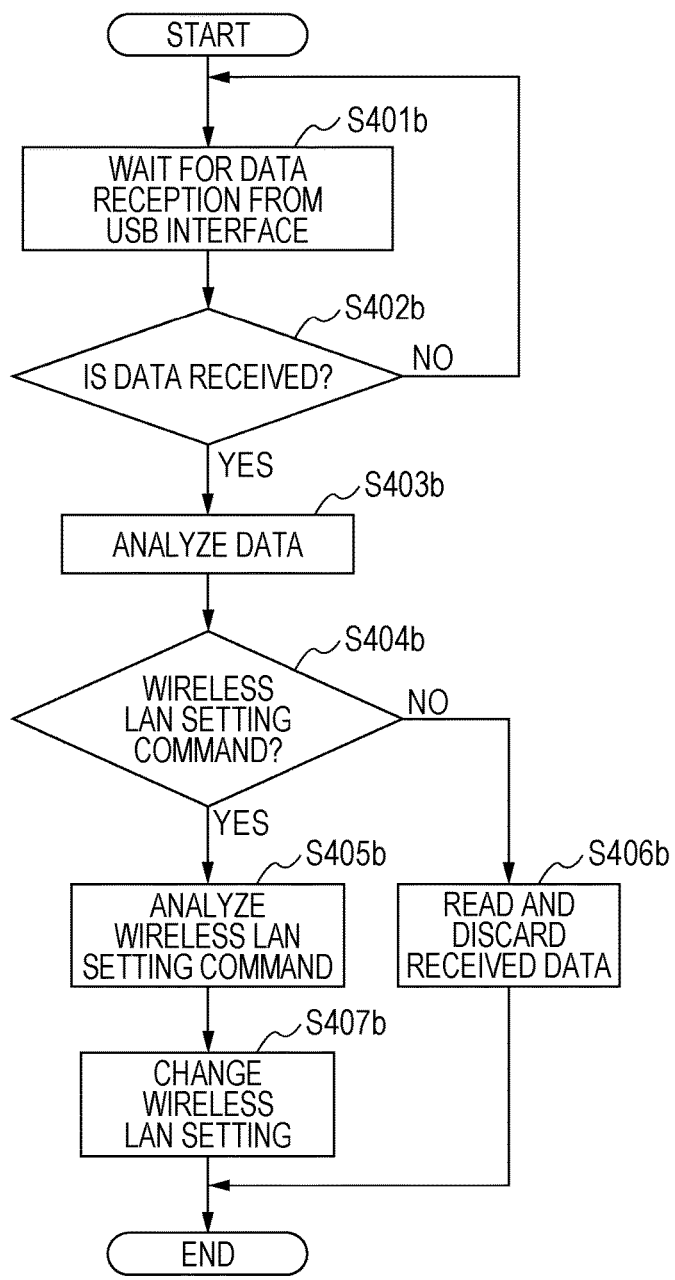

In addition, in the flowchart in FIG. 4C, if it is determined in step S404b that the received data is print data, the received data is read and discarded. As alternative processing, the CPU 101 may temporarily store the print data into the RAM 103, and start print processing of the print data held in the RAM 103, after the end of the arrival processing such as the cleaning and the registration adjustment.

Processing similar to the above exemplary embodiment is also realized by executing the following processing. More specifically, the processing is executed in such a manner that software (a program) for realizing the functions of the above exemplary embodiment is supplied to a system or an apparatus via a network or various recording media, and a computer (or a CPU, a micro processing unit (MPU), or the like) of the system or the apparatus reads and executes the program. In addition, the computer for executing the program may be a single computer, or a plurality of computers may execute the program in cooperation with each other. Furthermore, hardware such as a circuit for executing part of the program may be provided, and the hardware and the computer executing software may cooperate with each other to execute the processing described in the present exemplary embodiment.

According to the present invention, time taken for processing performed at arrival can be shortened.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-017861, filed Jan. 30, 2015 which is hereby incorporated by reference herein in its entirety.

What is claimed is:

1. A print control apparatus comprising:
one or more processors; and
one or more memories storing instructions which, when executed by the one or more processors, cause the print control apparatus to function as:
a receiving unit;
a display control unit configured to display a screen including a selectable item to be selected for starting a wireless connection setting process for establishing a wireless connection;
a control unit configured to perform a first processing for the wireless connection setting process in a case where a user selects the selectable item on the displayed screen, wherein the first processing comprises enabling the receiving unit to receive a command from an external apparatus, the command comprising a connection parameter for wirelessly connecting to an access point;
a setting unit configured to perform a second processing for the wireless connection setting process, after the control unit performs the first processing, wherein the second processing comprises setting, based on the command received from the external apparatus, a connection parameter for wirelessly connecting to the access point; and
an execution unit configured to execute registration adjustment in a case where the control unit performs the first processing, wherein the registration adjustment comprises printing a plurality of patterns, reading the plurality of patterns and determining a correction value based on the read plurality of patterns,
wherein, in a case where it is determined that the print control apparatus is activated for a first time, communication interfaces of the print control apparatus, including the receiving unit, are set to a predetermined state in which the communication interfaces do not perform processing to receive data from external apparatuses,
wherein, in a case where the user selects the selectable item on the displayed screen,the control unit changes the state of the receiving unit from the predetermined state to a receiving state in which the receiving unit is enabled to perform processing to receive data from external apparatuses, the receiving unit being an interface that is different from a wireless interface used for the wireless connection, and
wherein the registration adjustment and the second processing are executed at least in part concurrently, and the connection parameter for wirelessly connecting to the access point is received from the external apparatus via the receiving unit when the receiving unit is in the receiving state.

2. The print control apparatus according to claim 1, wherein the print control apparatus further functions as a determination unit configured to determine whether the print control apparatus is activated for the first time, based on information indicating first activation that is held in a storage unit of the print control apparatus,
wherein the first processing, the second processing and the registration adjustment are executed in a case where it is determined that the print control apparatus is activated for the first time.

3. The print control apparatus according to claim 1, wherein the control unit is further configured to control whether to execute processing of a command received from the external apparatus, during execution of the registration adjustment.

4. The print control apparatus according to claim 3, wherein, in a case where the user selects the selectable item on the displayed screen, the control unit executes processing that is based on a command including the connection parameter, and, until completion of the registration adjustment, does not execute processing that is based on a command different from the command including the connection parameter.

5. The print control apparatus according to claim 4, wherein, in a case where the user selects the selectable item on the displayed screen, the control unit executes processing that is based on a command including the connection parameter, and, until completion of the registration adjustment, executes processing that reads and discards a print command.

6. The print control apparatus according to claim 1, wherein setting the connection parameter for wirelessly connecting to the access point is performed as part of a wireless local area network (LAN) connection process.

7. The print control apparatus according to claim 1, wherein the registration adjustment and the second processing are executed at least in part concurrently as part of arrival processing.

8. The print control apparatus according to claim 1, wherein the receiving unit is a Universal Serial Bus (USB) interface.

9. The print control apparatus according to claim 1,
wherein if a print request is received by the receiving unit after the receiving unit is enabled to receive data but before the registration adjustment is completed, the control unit does not execute a print process in connection with the print request until the registration adjustment is completed.

10. The print control apparatus according to claim 1, wherein at least a portion of the second processing is performed concurrently with execution of at least a portion of the registration adjustment.

11. The print control apparatus according to claim 1, wherein the display control unit is configured to display another screen for notifying the user that a sheet for the registration adjustment is required, and the display control unit is configured to display the screen including the selectable item in a case that the user responds to the another screen, and
wherein the execution unit is configured to execute the registration adjustment by printing patterns for the registration adjustment on the sheet and reading the patterns from the sheet in the case where the control unit performs the first processing.

12. A control method for a print control apparatus, the control method comprising:
displaying a screen including a selectable item to be selected for starting a wireless connection setting process for establishing a wireless connection;
performing a first processing for the wireless connection setting process in a case where a user selects the selectable item on the displayed screen, wherein the first processing comprises enabling a receiving unit to receive a command from an external apparatus, the command comprising a connection parameter for wirelessly connecting to an access point;

performing a second processing for the wireless connection setting process, after the control unit performs the first processing, wherein the second processing comprises setting, based on the command received from the external apparatus, a connection parameter for wirelessly connecting to the access point; and executing registration adjustment in a case where the control unit performs the first processing, wherein the registration adjustment comprises printing a plurality of patterns, reading the plurality of patterns and determining a correction value based on the read plurality of patterns, wherein, in a case where it is determined that the print control apparatus is activated for a first time, communication interfaces of the print control apparatus, including the receiving unit, are set to a predetermined state in which the communication interfaces do not perform processing to receive data from external apparatuses, wherein, in a case where the user selects the selectable item on the displayed screen, the control unit changes the state of the receiving unit from the predetermined state to a receiving state in which the receiving unit is enabled to perform processing to receive data from external apparatuses, the receiving unit being an interface that is different from a wireless interface used for the wireless connection, and wherein the registration adjustment and the second processing are executed at least in part concurrently, and the connection parameter for wirelessly connecting to the access point is received from the external apparatus via the receiving unit when the receiving unit is in the receiving state.

13. The control method according to claim 12, further comprising determining whether the print control apparatus is activated for the first time, based on information indicating first activation that is held in a storage unit of the print control apparatus, wherein the first processing, the second processing and the registration adjustment are executed in a case where it is determined that the print control apparatus is activated for the first time.

14. The control method according to claim 12, further comprising controlling whether to execute processing of a command received from the external apparatus, during execution of the registration adjustment.

15. The control method according to claim 14, wherein, in a case where the user selects the selectable item on the displayed screen, the controlling includes, until completion of the registration adjustment, executing processing that is based on a command including the connection parameter, and includes not executing processing that is based on a command different from the command including the connection parameter.

16. The control method according to claim 15, wherein, in a case where the user selects the selectable item on the displayed screen, the controlling includes, until completion of the registration adjustment, executing processing that is based on a command including the connection parameter, and includes executing processing that reads and discards a print command.

17. The control method according to claim 12, wherein setting the connection parameter for wirelessly connecting to the access point is performed as part of a wireless local area network (LAN) connection process.

18. The control method according to claim 12, wherein the registration adjustment and the second processing are executed at least in part concurrently as part of arrival processing.

19. The print control apparatus according to claim 12, wherein the receiving unit is a Universal Serial Bus (USB) interface.

20. A non-transitory computer readable storage medium storing instructions for causing a print control apparatus to perform a control method, the control method comprising:

displaying a screen including a selectable item to be selected for starting a wireless connection setting process for establishing a wireless connection;

performing a first processing for the wireless connection setting process in a case where a user selects the selectable item on the displayed screen, wherein the first processing comprises enabling a receiving unit to receive a command from an external apparatus, the command comprising a connection parameter for wirelessly connecting to an access point;

performing a second processing for the wireless connection setting process, after the control unit performs the first processing, wherein the second processing comprises setting, based on the command received from the external apparatus, a connection parameter for wirelessly connecting to the access point; and executing registration adjustment in a case where the control unit performs the first processing, wherein the registration adjustment comprises printing a plurality of patterns, reading the plurality of patterns and determining a correction value based on the read plurality of patterns, wherein, in a case where is determined that the print control apparatus is activated for a first time, communication interfaces of the print control apparatus, including the receiving unit, are set to a predetermined state in which the communication interfaces do not perform processing to receive data from external apparatuses, wherein, in a case where the user selects the selectable item on the displayed screen, the control unit changes the state of the receiving unit from the predetermined state to a receiving state in which the receiving unit is enabled to perform processing to receive data from external apparatuses, the receiving unit being an interface that is different from a wireless interface used for the wireless connection, and wherein the registration adjustment and the second processing are executed at least in part concurrently, and the connection parameter for wirelessly connecting to the access point is received from the external apparatus via the receiving unit when the receiving unit is in the receiving state.

* * * * *